(12) United States Patent
Varekamp

(10) Patent No.: US 11,368,663 B2
(45) Date of Patent: Jun. 21, 2022

(54) IMAGE GENERATING APPARATUS AND METHOD THEREFOR

(71) Applicant: KONINKLIJKE PHILIPS N.V., Eindhoven (NL)

(72) Inventor: Christiaan Varekamp, Veldhoven (NL)

(73) Assignee: Koninklijke Philips N.V., Eindhoven (NL)

(*) Notice: Subject to any disclaimer, the term of this patent is extended or adjusted under 35 U.S.C. 154(b) by 0 days.

(21) Appl. No.: 17/287,540

(22) PCT Filed: Oct. 23, 2019

(86) PCT No.: PCT/EP2019/078782
§ 371 (c)(1),
(2) Date: Apr. 22, 2021

(87) PCT Pub. No.: WO2020/083950
PCT Pub. Date: Apr. 30, 2020

(65) Prior Publication Data
US 2021/0385422 A1    Dec. 9, 2021

(30) Foreign Application Priority Data

Oct. 23, 2018 (EP) .................................... 18202085

(51) Int. Cl.
*H04N 13/128* (2018.01)
*H04N 13/383* (2018.01)
(Continued)

(52) U.S. Cl.
CPC ......... *H04N 13/128* (2018.05); *H04N 13/117* (2018.05); *H04N 13/383* (2018.05);
(Continued)

(58) Field of Classification Search
CPC .. H04N 13/128; H04N 13/117; H04N 13/383; H04N 13/398; H04N 13/344; H04N 13/371; H04N 2013/0081
(Continued)

(56) References Cited

U.S. PATENT DOCUMENTS 5,726,704 A * 3/1998 Uomori ................ H04N 13/128
348/47
9,224,232 B2 * 12/2015 Hattori .................. G06T 15/005
(Continued)

OTHER PUBLICATIONS

Bernard et al "The Effects of Fast Disparity Adjustment in Gaze-Controlled Stereoscopic Applications" ETRA'14 Proceedings of the Symposium On Eye Tracking Research and Applications, Mar. 2014 p. 111-118.

(Continued)

*Primary Examiner* — Tung T Vo

(57) ABSTRACT

An apparatus comprises a determiner (305) which determines a first-eye and a second eye view pose. A receiver (301) receives a reference first-eye image with associated depth values and a reference second-eye image with associated depth values, the reference first-eye image being for a first-eye reference pose and the reference second-eye image being for a second-eye reference pose. A depth processor (311) determines a reference depth value, and modifiers (307) generate modified depth values by reducing a difference between the received depth values and the reference depth value by an amount that depends on a difference between the second or first-eye view pose and the second or first-eye reference pose. A synthesizer (303) synthesizes an output first-eye image for the first-eye view pose by view shifting the reference first-eye image and an (Continued)

output second-eye image for the second-eye view pose by view shifting the reference second-eye image based on the modified depth values. The terms first and second may be replaced by left and right, respectively or vice verse. E.g. the terms first-eye view pose, second-eye view pose, reference first-eye image, and reference second-eye image may be replaced by left-eye view pose, right-eye view pose, reference left-eye image, and reference right-eye image, respectively.

20 Claims, 11 Drawing Sheets

(51) Int. Cl.
| | | |
|---|---|---|
| *H04N 13/117* | (2018.01) | |
| *H04N 13/398* | (2018.01) | |
| *H04N 13/371* | (2018.01) | |
| *H04N 13/344* | (2018.01) | |
| *H04N 13/00* | (2018.01) | |

(52) U.S. Cl.
CPC ......... *H04N 13/398* (2018.05); *H04N 13/344* (2018.05); *H04N 13/371* (2018.05); *H04N 2013/0081* (2013.01)

(58) Field of Classification Search
USPC .......................................................... 348/51
See application file for complete search history.

(56) References Cited

U.S. PATENT DOCUMENTS

| | | | |
|---|---|---|---|
| 9,485,487 B2 | 11/2016 | Kroon | |
| 2010/0104219 A1* | 4/2010 | Limonov | H04N 13/10 382/285 |
| 2011/0069153 A1* | 3/2011 | Nakane | H04N 13/178 348/43 |
| 2014/0035902 A1* | 2/2014 | An | H04N 13/128 345/419 |
| 2015/0195512 A1* | 7/2015 | Kishikawa | H04N 13/275 348/55 |
| 2016/0191888 A1 | 6/2016 | Blonde et al. | |
| 2017/0230633 A1 | 8/2017 | Doh | |
| 2019/0273902 A1 | 9/2019 | Varekamp et al. | |
| 2020/0137375 A1 | 4/2020 | Kroon et al. | |

OTHER PUBLICATIONS

International Search Report and Written Opinion From PCT/EP2019/078782 dated Apr. 30, 2020.

* cited by examiner

IMAGE GENERATING APPARATUS AND METHOD THEREFOR

CROSS-REFERENCE TO PRIOR APPLICATIONS

This application is the U.S. National Phase application under 35 U.S.C. § 371 of International Application No. PCT/EP2019/078782, filed on Oct. 23, 2019, which claims the benefit of EP Patent Application No. EP 18202085.9, filed on Oct. 23, 2018. These applications are hereby incorporated by reference herein.

FIELD OF THE INVENTION

The invention relates to image generation from first-eye and second-eye images and associated depth, and in particular, but not exclusively, to image generation for e.g. limited virtual reality applications and services.

BACKGROUND OF THE INVENTION

The variety and range of image and video applications have increased substantially in recent years with new services and ways of utilizing and consuming video being continuously developed and introduced.

For example, one service being increasingly popular is the provision of image sequences in such a way that the viewer is able to actively and dynamically interact with the system to change parameters of the rendering. A very appealing feature in many applications is the ability to change the effective viewing position and viewing direction (the viewing pose) of the viewer, such as for example allowing the viewer to move and "look around" in the scene being presented. Such a feature can specifically enable a virtual reality experience being provided to a user.

It is also desirable for many applications, that the image being presented is a three-dimensional image. Indeed, in order to optimize immersion of the viewer, it is typically preferred for the user to experience the presented scene as a three-dimensional scene.

A major issue in supporting various services based on, in particular three dimensional, representations of a scene is that a large amount of data is required. This results in high resource requirements, such as a need for large storage resources. However, in many scenarios, the biggest constraint is not storage or processing requirements but communication requirements. If it is required that the data representing the scene must be communicated over a bandwidth limited communication channel (whether internal or external), it is highly desirable to try to reduce the amount of data that needs to be communicated.

For example, in many scenarios and for many applications, a client server approach may be used wherein a remote client executing e.g. a virtual reality application is coupled to a central service that provides the required scene data over a bandwidth limited link.

A particular proposed service seeks to provide a limited virtual reality experience by allowing a 3D experience that adapts to the user's movements as long as these are small and do not differentiate too far from a given reference point. For example, a 3D experience of a scene may be provided for a given virtual viewpoint with the experience adapting to the user making small head movements while essentially staying in the same spot. For example, the service may provide an experience where the rendered 3D view follows movements such as nodding or shaking the head but does not follow if the user moves his head substantially to the side. A service may provide a full 3D experience as long as the user's eyes remain within a small sweet spot. This sweet spot may for each eye have an extent of only a few centimeters.

Such an approach may allow a high quality 3D experience to be provided based on a limited amount of data, both in terms of captured and communicated data. Typically, a-left-eye image and a-right eye image with associated depth maps may be provided to a local renderer. The renderer may then generate view images for the current view based on the received images and the depth maps for positions that are very close to (within the sweet spot area of) the nominal position. This may provide a very natural experience in many scenarios while maintaining a very low data rate. For example, for a conference application, the provision of a two image streams (one for each eye) and associated depth data may allow a 3D representation of the remote end with consistent stereopsis and motion parallax as long as the user remains in the same position and only makes small head movements. Thus, a very natural and high quality experience can be provided.

However, an issue with such services is that the user may potentially move outside the sweet spot. This will tend to result in a fast and significant degradation in image quality, including the introduction of perceptible artefacts (e.g. due to a lack of de-occlusion data). In many cases, the quality may degrade very quickly resulting in a very undesirable user experience.

Different solutions have been proposed to this problem. Many systems are arranged to increasingly blur or darken the image as the user moves away from the preferred position and sweet spot. In many cases, when the user moves outside the sweet spot, the viewer is presented a blurred picture or a black picture. This of course hides the quality degradation and also tends to bias the user towards remaining in the sweet spot.

However, current solutions tend not to be optimal in terms of user experience, data rate, complexity etc.

Hence, an improved approach for synthesizing images would be advantageous. In particular, an approach that allows improved operation, facilitated operation, improved quality, increased flexibility, facilitated implementation, facilitated operation, reduced data rate, reduced data storage, distribution, and/or processing resource requirements, improved adaptability, improved image quality, improved user experience, and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided an image generating apparatus comprising: a determiner for determining a first-eye view pose and a second-eye view pose; a receiver for receiving a reference first-eye image with associated first depth values and a reference second-eye image with associated second depth values, the reference first-eye image being for a first-eye reference pose and the reference second-eye image being for a second-eye reference pose; a depth processor for determining a reference depth value; a first modifier for generating modified first depth values by reducing a difference between the first depth values and the reference depth value by a first amount dependent on a difference between the first-eye view pose and the first-eye reference pose; a second modifier for generating modified second depth values by reducing a difference between the second depth values and the reference depth value by a second amount dependent on a difference between the second-eye view pose and the second-eye reference pose; and a synthesizer for synthesizing an output first-eye image for the first-eye view pose by view shifting the reference first-eye image based on the modified first depth values and an output second-eye image for the second-eye view pose by view shifting the reference second-eye image based on the modified second depth values.

The invention may allow an improved user experience in many embodiments and scenarios. The approach may in many scenarios allow an increased freedom of movement of a viewer and may reduce the perceived degradation when a viewer moves outside the sweet spot. The approach may allow an improved trade-off between image quality degradation from view shifting and spatial distortion. In many scenarios, the approach may allow an improved gradual deterioration of perceived image quality with increasing distance from a view pose to a reference view pose for which image data is provided. The approach may further allow advantageous operation while having a low complexity and/or resource usage and/or may allow facilitated implementation.

The approach may for example allow three dimensional perception of a scene even for view poses or positions that differ by an amount where view shifting may tend to be unreliable or introduce substantial artefacts.

A pose may be a position and/or orientation. A difference between poses may for example be a Euclidian distance between the corresponding positions and/or may e.g. be an angular distance between corresponding orientations (or of course a combined measure of both Euclidian and angular distance).

The difference between the view pose and the reference pose for the first eye and/or second eye may be determined in accordance with any suitable distance or difference measure. The difference may for example be determined as a monotonically increasing function of a distance between a position of the view pose and a position of the reference pose and/or a monotonically increasing function of an (absolute value of an) angular difference between an orientation of the view pose and an orientation of the reference pose.

The view pose may for example be determined relative to the reference poses. For example, at a given time instant, the current view pose may be designated to correspond to the reference view pose. Thus, for that view pose no view shifting is necessary to generate the output images, or equivalently the received images may be set to represent view images for that view pose. Subsequent view poses may then be determined relative to the view pose designated to correspond to the reference pose. Such a process of linking the reference poses to view poses may for example be performed at initialization of a service and/or iteratively at different time instants during the service. It will be appreciated that the receiver need not receive specific information indicating a first-eye or second eye reference pose but that the images inherently correspond to such poses. The reference poses may be determined by setting them equal to a current view pose at a time instant and subsequent view poses may be determined relative to such a nominal/reference view pose.

The first and second amounts may be absolute or relative amounts. For example, the first and second amounts may be first and second factors for scaling the difference between the first, and respectively second, depth values and the reference depth value.

The first-eye may be one of a left-eye and a right-eye of a viewer and the second-eye may be the other of the left-eye and the right-eye of the viewer. In some embodiments, the first-eye may be the left-eye and the second-eye may be the right-eye, or vice versa. All references to the first-eye and the left-eye may in some examples be replaced by references to the left-eye and right eye respectively or may in some examples be replaced by references to the right-eye and the left-eye respectively.

In accordance with an optional feature of the invention, the depth processor is arranged to determine the reference depth value as a predetermined reference depth value.

This may allow low complexity, resource usage, and/or facilitate implementation while providing high performance and an advantageous user experience in many scenarios. The reference depth value may in some embodiments be a constant or fixed depth value and/or may be independent of any properties of the first or second depth values.

In accordance with an optional feature of the invention, the depth processor is arranged to determine a gaze point for a viewer in at least one of the reference first-eye image and the reference second-eye image; and to determine the reference depth value in response to a depth value of at least one of the first depth values and the second depth values for the gaze point.

This may provide advantageous performance in many embodiments and may specifically reduce the perceptible impact of e.g. depth distortions in many scenarios.

In accordance with an optional feature of the invention, the first modifier is arranged to reduce the difference between the first depth values and the reference depth value to substantially zero for at least some values of the difference between the first-eye view pose and the first-eye reference pose.

This may provide a particularly advantageous user experience in many embodiments. The corresponding feature may also be adopted by the second modifier.

The feature may specifically allow for a low complexity approach of reducing in particular de-occlusion artefacts to be introduced for larger differences between view pose and reference pose.

In some embodiments, the second modifier is arranged to reduce the difference between the second depth values and the reference depth value to substantially zero for at least some values of the difference between the second-eye view pose and the second-eye reference pose In accordance with an optional feature of the invention, the first modifier is arranged to not reduce the difference between the first depth values and the reference depth value for at least some values of the difference between the first-eye view pose and the first-eye reference pose.

This may provide a particularly advantageous user experience in many embodiments. The corresponding feature may also be adopted by the second modifier.

The feature may specifically allow a low complexity approach of reducing perceived depth/spatial distortions for smaller differences between view pose and reference pose.

In some embodiments, the second modifier is arranged to not reduce the difference between the second depth values and the reference depth value for at least some values of the difference between the second-eye view pose and the second-eye reference pose.

In accordance with an optional feature of the invention, the first modifier is arranged to determine the first amount as a monotonically increasing function of the difference between the first-eye view pose and the first-eye reference pose.

This may provide a particularly advantageous user experience in many embodiments. The corresponding feature may also be adopted by the second modifier.

This may provide an advantageous gradual trade-off between view shift degradation and depth adaptation distortion.

In some embodiments, the second modifier is arranged to determine the second amount as a monotonically increasing function of the difference between the second-eye view pose and the second-eye reference pose.

In accordance with an optional feature of the invention, the first modifier is arranged to generate modified depth values by scaling a difference between the first depth values and the reference depth value by a scale factor having a value between zero and one for at least some values of the difference between the first-eye view pose and the first-eye reference pose.

In some embodiments, the second modifier is arranged to generate modified depth values by scaling a difference between the second depth values and the reference depth value by a scale factor having a value between zero and one for at least some values of the difference between the second-eye view pose and the second-eye reference pose.

This may provide a particularly advantageous user experience in many embodiments. The corresponding feature may also be adopted by the second modifier.

In accordance with an optional feature of the invention, the scale factor is a monotonically decreasing function of the difference between the first-eye view pose and the first-eye reference pose for at least a range of the difference between the first-eye view pose and the first-eye reference pose.

This may provide a particularly advantageous user experience in many embodiments. The corresponding feature may also be adopted by the second modifier.

This may provide an advantageous gradual trade-off between view shift degradation and depth adaptation distortion.

In accordance with an optional feature of the invention, the scale factor has a value between 0.95 and 1.05 for the difference between the first-eye view pose and the first-eye reference pose being below a threshold.

In many embodiments, the scale factor has a value of substantially one for the difference between the first-eye view pose and the first-eye reference pose being below a threshold.

This may provide a particularly advantageous user experience in many embodiments. The corresponding feature may also be adopted by the second modifier.

The feature may specifically allow a low complexity approach of reducing perceived depth/spatial distortions for smaller differences between view pose and reference pose.

In accordance with an optional feature of the invention, the synthesizer is arranged to shift the reference first-eye image and the reference second-eye image in the same direction.

In accordance with an optional feature of the invention, the first modifier is arranged to limit the difference between the first modified depth values and the reference depth value.

In some embodiments, the first modifier is arranged to limit the difference between the first modified depth values and the reference depth value to (be below) a limit.

This may provide a particularly advantageous user experience in many embodiments. The corresponding feature may also be adopted by the second modifier.

The limit may be applied in only one direction and/or may be asymmetric and different in the forwards and backwards direction.

In many embodiments, the first modifier may be arranged to limit the difference between the first modified depth values and the reference depth value such that the first modified depth values are limited to be no further forward from the reference depth value than a limit.

In many embodiments, the first modifier may be arranged to limit the difference between the first modified depth values and the reference depth value such that the first modified depth values are limited to be no further backwards from the reference depth value than a limit.

In many embodiments, the first modifier may be arranged to limit an absolute value of the difference between the first modified depth values and the reference depth values to be below a limit.

In accordance with an optional feature of the invention, the first modifier is arranged to apply a same relationship between the first amount and the difference between the first-eye view pose and the first-eye reference pose as the relationship applied by the second modifier between the second amount and the difference between the second-eye view pose and the second-eye reference pose.

This may provide advantageous operation in many embodiments.

According to an aspect of the invention there is provided a method of image generation, the method comprising: determining a first-eye view pose and a second-eye view pose; receiving a reference first-eye image with associated first depth values and a reference second-eye image with associated second depth values, the reference first-eye image being for a first-eye reference pose and the reference second-eye image being for a second-eye reference pose; determining a reference depth value; generating modified first depth values by reducing a difference between the first depth values and the reference depth value by a first amount dependent on a difference between the first-eye view pose and the first-eye reference pose; generating modified second depth values by reducing a difference between the second depth values and the reference depth value by a second amount dependent on a difference between the second-eye view pose and the second-eye reference pose; and synthesizing an output first-eye image for the first-eye view pose by view shifting the reference first-eye image based on the modified first depth values and an output second-eye image for the second-eye view pose by view shifting the reference second-eye image based on the modified second depth values.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF THE EMBODIMENTS

Figure 1:
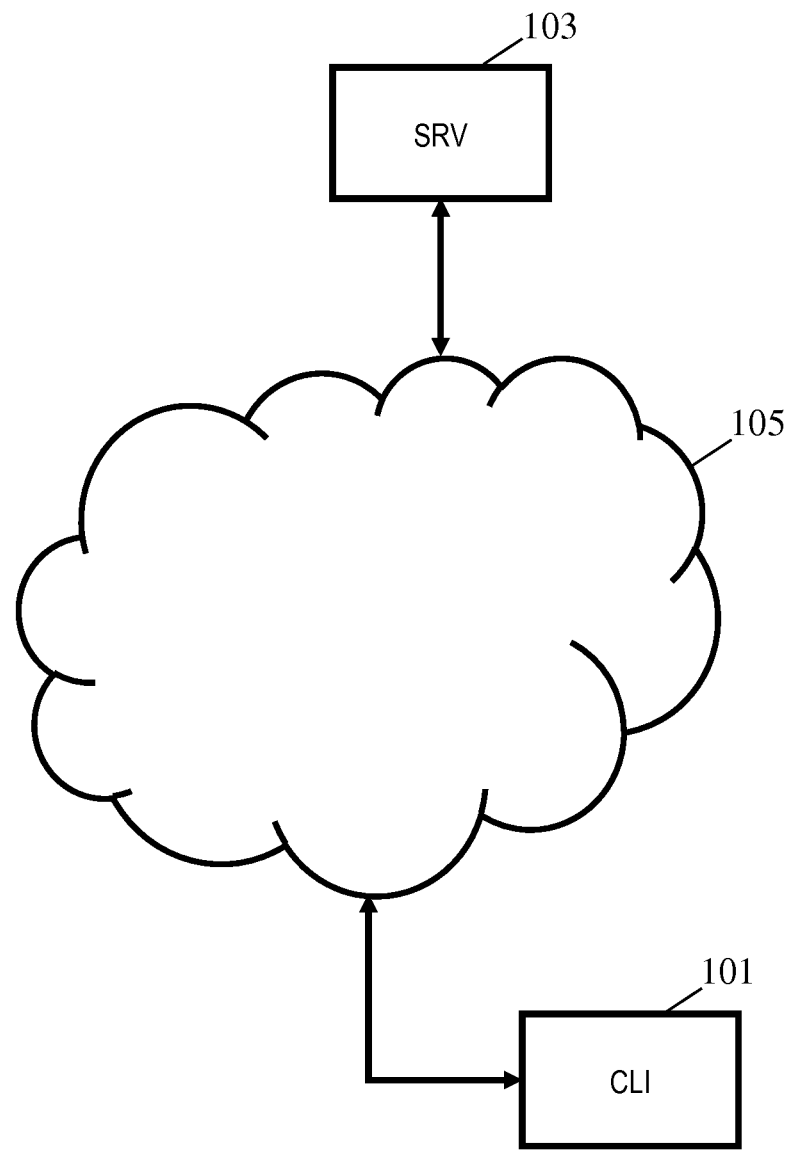
FIG. 1 illustrates an example of elements of an image processing system in accordance with some embodiments of the invention.

FIG. 1 illustrates an example of a system that may embody examples and variants of embodiments of the inventive concept.

In the example, a client in the form of an image generating apparatus 101 is arranged to locally synthesize images based on images received from an image source apparatus 103. In the example, the images may be provided in an image data stream transmitted (or possibly broadcast) from the image source apparatus 103 which operates as a remote server. The image source apparatus 103 is arranged to provide the image data stream via a network 105 which may for example be the Internet. The arrangement may correspond to a client server arrangement and accordingly the image generating apparatus 101 can also be referred to as the client and the image source apparatus 103 can also be referred to as the server.

As an example, the approach may be used to provide a remote conference service or application, and the image source apparatus 103 may for example operate as a conference bridge providing a video stream to the image generating apparatus 101 which may operate as a conference client. It will be appreciated that the image generating apparatus 101 may in some embodiments also be arranged to capture local video and transmit this to the image source apparatus 103 operating as a conference bridge. It will also be appreciated that the image data stream is in many applications, such as in a conference application, provided with an associated audio stream thus providing a full audiovisual representation.

It will also be appreciated that the described approach is not reliant on a client server configuration but may be used in any configuration. For example, in some embodiments, two identical conference apparatuses may directly communicate to enable a conference service. In such an example, each apparatus may comprise functionality as described in the following for both the image generating apparatus 101 and for the image source apparatus 103.

The image source apparatus 103 provides an image data stream which comprises images of the scene captured from different poses. In particular, it includes at least a first-eye (camera) image corresponding to a first-eye pose and a second-eye (camera) image corresponding to a second-eye pose. The image data stream may specifically provide a stereo image comprising the first-eye image and second-eye image or a moving sequence of stereo images (stereo video).

The references to first-eye and the second-eye will in the following examples and figures mainly refer to the left-eye and right-eye of a viewer respectively, but it will be appreciated that this may not be the case in all examples. For example, in other examples, the references to first-eye and the second-eye may refer to the right-eye and left-eye of a viewer respectively In the field, the terms placement or a pose is used as a common term for position and/or direction/orientation and the combination of the position and direction/orientation of e.g. an object, a camera, or a view is indeed typically referred to as a pose or placement. Thus, a placement or pose indication may comprise six values/components/degrees of freedom with each value/component typically describing an individual property of the position/location or the orientation/direction of the corresponding object. Of course, in many situations, a placement or pose may be considered or represented with fewer components, for example if one or more components is considered fixed or irrelevant (e.g. if all objects are considered to be at the same height and have a horizontal orientation, four components may provide a full representation of the pose of an object). In the following the term pose is used to refer to a position and/or orientation which may be represented by one to six values (corresponding to the maximum possible degrees of freedom). The description will focus on embodiments and examples where a pose has the maximum degrees of freedom, i.e. three degrees of freedom of each of the position and the orientation resulting in a total of six degrees of freedom (6DoF). The pose may thus be represented by a set or vector of six values representing the six degrees of freedom and thus the pose vector may provide a three-dimensional position and/or a three-dimensional direction indication. However, it will be appreciated that in other embodiments, the pose may be represented by fewer values.

It will be appreciated that in some embodiments, more than two simultaneous images may be provided. For example, images may be provided from a linear array of cameras and the first-eye image and second-eye image may be selected as images from two of these cameras (with the selection typically being performed by the image generating apparatus 101 based on the position of a viewer.

In addition to the first-eye image and the second-eye image, the image data stream comprises a set of depth values for the first-eye image, henceforth referred to as first depth values, and a set of depth values for the second-eye image, henceforth referred to as second depth values. The depth values may be any suitable values and in any suitable form. Specifically, the depth values may be in the form of a first-eye depth map and a second-eye depth map for the first-eye image and second-eye image respectively. The depth maps may directly comprise distance (in the z-direction, i.e. perpendicular to the image plane) or disparity values.

The poses for which the first-eye image and second-eye image are provided, i.e. the received first-eye pose and second-eye pose are reference poses for which the received first-eye image and second-eye image directly provide a stereo view for the scene.

In many embodiments, the image data stream may comprise only the reference first-eye image and the reference second-eye image with no specific indication of specific associated reference poses except that they correspond to views of the same scene for respectively the first eye and the second eye of a viewer, e.g. the left and right eyes of a (nominal) viewer. The image generating apparatus 101 may accordingly link the images with locally determined reference poses which can be used as the basis for determining changes in the view poses. For example, at the start of a service the current pose of a viewer may be considered a nominal pose for which the received images are presented directly, i.e. the nominal locally determined view poses for the first and second eyes are considered to correspond to the poses of the received reference images. Thus, the first-eye reference pose is determined as the nominal first-eye view pose and the second-eye reference pose is determined as the nominal second-eye view pose, e.g, the first-eye reference pose is determined as the nominal left-eye view pose and the second-eye reference pose is determined as the nominal right-eye view pose. Movements of the user from this nominal pose accordingly results in dynamically changing view poses that are determined relative to the nominal/reference poses.

For view poses that correspond directly to the reference poses, the image generating apparatus 101 may directly generate output images corresponding to the received first-eye image and second-eye image (which may accordingly also be referred to as reference images) and when presented to the left and right eyes of a user (e.g. by a dedicated headset or a stereo display (e.g. requiring the user to wear glasses)) they may directly provide a 3D view of the scene.

However, if the user moves his head, the viewpoint and view pose will change and for a natural experience it is desired that the images presented to the user changes to reflect this change. This may be achieved by performing a view point shift corresponding to the change in view poses from the reference view poses using the associated depth data. However, the quality of such synthesized images may deteriorate substantially unless the change in poses is very small. Therefore, the view point shift is in many scenarios preferably limited to a relatively small sweet spot.

For example, when multiple cameras are used to capture a 3D representation of a scene, playback on a virtual reality headset is often spatially limited to virtual viewpoints that lie close to the original camera locations. This ensures that the render quality of the virtual viewpoints does not show artefacts, typically the result of missing information (occluded data) or 3D estimation errors. Inside the so-called sweet spot, rendering can be done directly from one or multiple reference camera images with associated depth map or mesh using standard texture mapping in combination with view blending.

Figure 2:
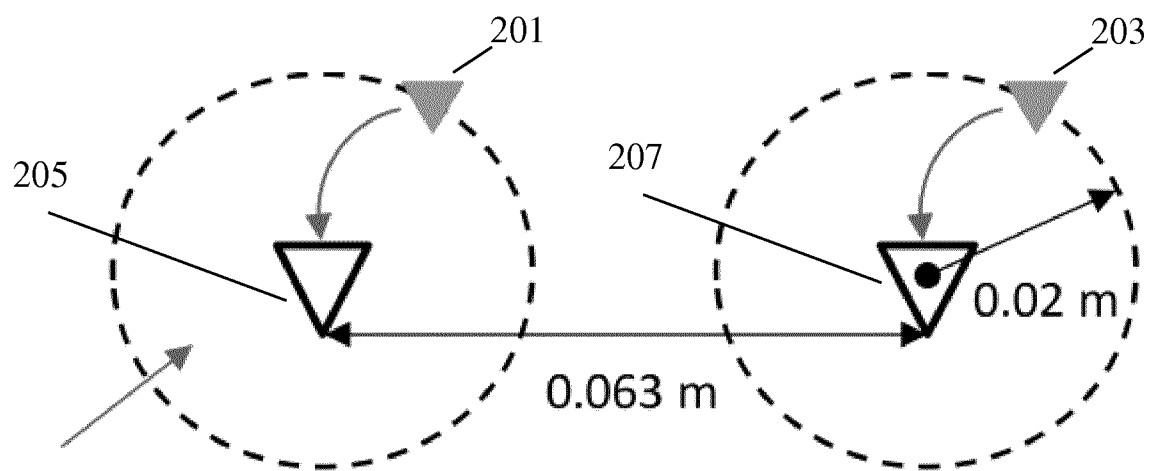
FIG. 2 illustrates an example of view poses.

This may be illustrated by the example of FIG. 2. In the example, eye positions/poses are illustrated by triangles. In the example, a first-eye view pose 201 (in the example being a left-eye view pose) and a second-eye view pose 203 (in the example being a right-eye view pose) are located with a distance of 2 cm to a reference first-eye pose 205 (in the example being a reference left-eye pose) and a reference second-eye pose 207 (in the example being a left-eye view pose). Accordingly, images may be generated for the view poses 201, 203 by view shifting of the received images for the reference poses 205, 207. In the example, it is considered that the current view poses 201, 203 are at the edge of a sweet spot for which the image quality of the images is considered acceptable. Accordingly, a problem will arise if the viewer moves any further away as image quality reduction and artefacts may become unacceptable.

Different solutions may be envisaged for such an issue. One approach may be to switch the reference poses to coincide with the current view poses, i.e. switch from providing view shifted images to providing the received reference images for the current view poses. Thus, effectively, for poses immediately outside the sweet spot, the view poses and the reference poses are realigned and movements around the new reference pose are then followed by view shifting relative to the new reference pose. However, such an approach will result in a sudden jump in the perceived view pose for the user (a significant parallax shift) which tends to be perceived has highly unnatural and unpleasant experience.

Other solutions may include presenting blurred or darkened (or black) images when the view poses move outside the sweet spot. However, this also tends to provide an unnatural experience and limits the movement freedom to typically a very small region.

Figure 3:
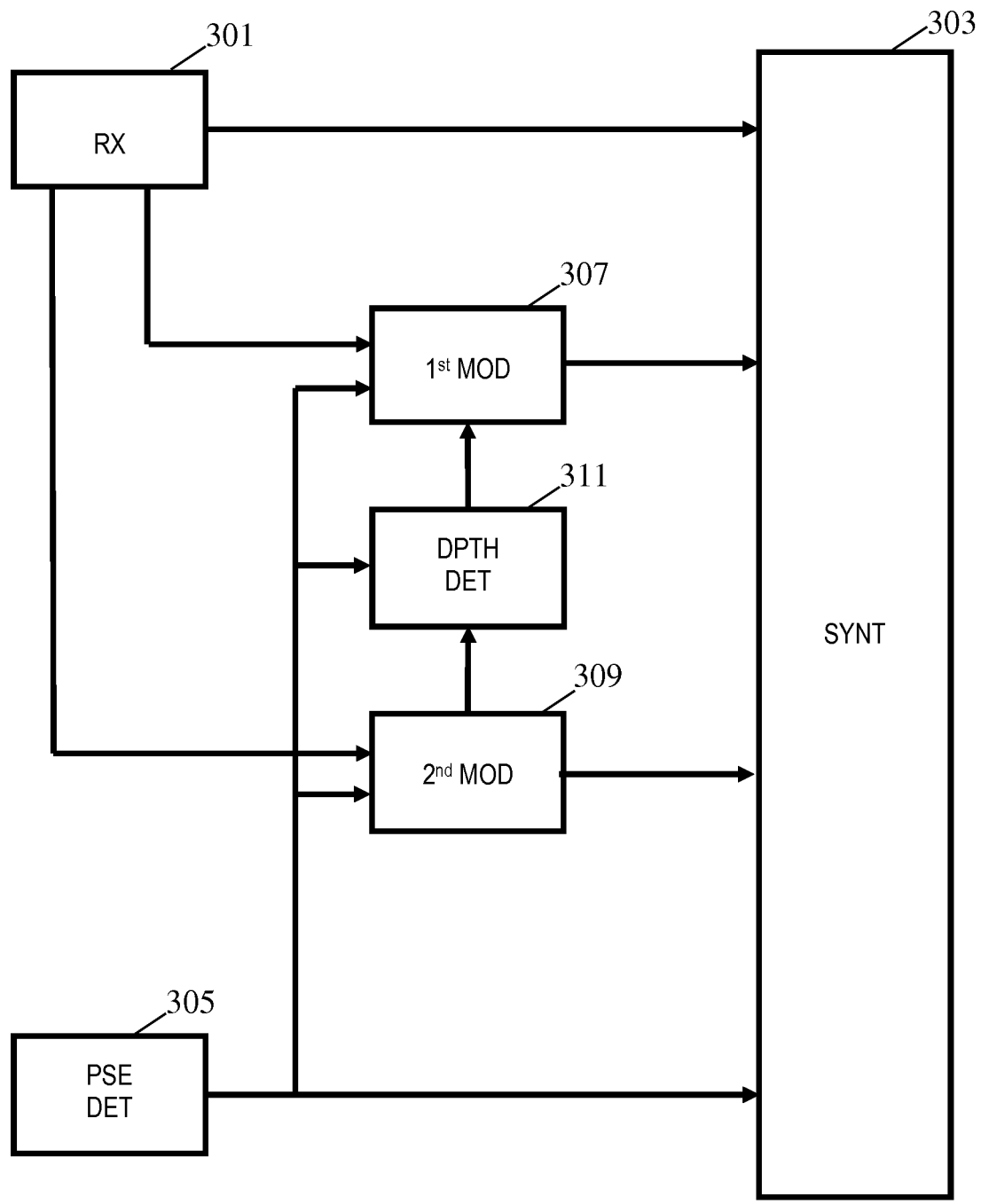
FIG. 3 illustrates an example of elements of an image generating apparatus in accordance with some embodiments of the invention.

FIG. 3 illustrates an example of an image generating apparatus 101 which may provide an improved user experience in many embodiments and scenarios, and which may in many scenarios provide an improved solution to the above described issue (as well as typically other advantages and benefits).

The image generating apparatus 101 comprises a receiver 301 which receives the image data stream from the image source apparatus 103. Thus, the receiver 301 receives at least a first-eye image with first depth values and a second-eye image with second depth values. Accordingly, image and depth are provided for at least a reference first-eye pose and a reference second-eye pose. In the following, it will for brevity and clarity be considered that the depth values are distance values provided in a depth map for each of the images.

The following will describe examples in which a first-eye image and a second-eye image are received which are considered to have been directly captured e.g. by two cameras with an appropriate distance between them. However, it will be appreciated that the first-eye image and second-eye image can be generated in any suitable way, and e.g. that a higher number of images for different poses can be received and the first-eye image and second-eye image can be selected or indeed generated from these.

For example, the approach can be used for a capture rig with many cameras. Camera selection logic can then be added such that an eye image is synthesized from a nearby subset of reference camera images. The sweet spot may then be defined as a distance function from the multiple reference camera positions.

The receiver 301 is coupled to a synthesizer 303 which is arranged to generate output images for viewer poses. Accordingly, the image synthesizer 303 is fed the first-eye image and the second-eye image in order to generate an output first-eye image and an output second-eye image, and specifically output left and right-eye images may be generated.

The synthesizer 303 is coupled to a pose determiner 305 which is arranged to determine a first-eye view pose and a second-eye view pose. The first-eye view pose is a pose corresponding to the pose of an intended viewers first eye (e.g. left) and the second-eye view pose is a pose corresponding to the intended viewers second eye (e.g. right). Thus, the first-eye view pose and the second-eye view pose correspond to the poses for which view images are to be rendered by the image generating apparatus 101 to provide a 3D image perception corresponding to the current pose of the viewer.

In some embodiments, the second-eye view pose and first-eye view pose may be determined individually and separately, e.g. based on individual measurements tracking the individual eye poses. However, in many embodiments, the first-eye view pose and the second-eye view pose may be determined together and represented by common data combined with e.g. predetermined information of the relative pose differences between the eyes of a viewer. For example, a single viewer position, and possibly head rotation, may be determined and be indicative of the first-eye view pose and the second-eye view pose. For example, it may be assumed that the eyes of a user have a predetermined distance (e.g. 6.3 cm in the example of FIG. 2) and the first-eye view pose and second-eye view pose are thus uniquely known from a head position indicating the position of an eye and a head rotation indicating the orientation of the head. Accordingly, in some embodiments, a single view pose may be estimated, and the first-eye view pose and second-eye view pose may be determined and given by this view pose. Therefore, for simplicity, the description may also refer to a single view pose as representing the first-eye view pose and the second-eye view pose, but it will be appreciated that such a reference to a single view pose includes a reference to separate first-eye and second-eye view poses.

A view pose input may be determined in different ways in different applications. In many embodiments, the physical movement of a user may be tracked directly. For example, a camera surveying a user area may detect and track the user's head (or even eyes). In many embodiments, the user may wear a VR headset which can be tracked by external and/or internal means. For example, the headset may comprise accelerometers and gyroscopes providing information on the movement and rotation of the headset and thus the head. In some examples, the VR headset may transmit signals or comprise (e.g. visual) identifiers that enable an external sensor to determine the position of the VR headset.

In some systems, the rendering view pose may be provided by manual means, e.g. by the user manually controlling a joystick or similar manual input. For example, the user may manually move the virtual viewer around in the virtual scene by controlling a first joystick with one hand and manually controlling the direction in which the virtual viewer is looking by manually moving a second joystick with the other hand.

In some applications a combination of manual and automated approaches may be used to generate the rendering view pose. For example, a headset may track the orientation of the head and the movement/position of the viewer in the scene may be controlled by the user using a joystick.

The pose determiner 305 is coupled to the image synthesizer 303 which is fed the first-eye view pose and the second-eye view pose. The image synthesizer 303 is arranged to synthesize an output first-eye image for the first-eye pose from the reference first-eye image. Specifically, based on appropriate depth data, the image synthesizer 303 may perform a view shift operation to modify the reference first-eye image to correspond to a view image for the current first-eye pose. Such view shifting is performed based on appropriate depth data and includes horizontal shifting of image objects based on their depth as will be known to the skilled person.

Similarly, the image synthesizer 303 is arranged to synthesize an output second-eye image for the second-eye pose from the reference second-eye image. Specifically, based on appropriate depth data, the image synthesizer 303 may perform a view shift operation to modify the reference second-eye image to correspond to a view image for the current second-eye pose.

It will be appreciated that the skilled person will be aware of many different approaches and algorithms for such view shifting/synthesis and that any suitable approach may be used. It will also be appreciated that whereas in many embodiments, the output first-eye image is generated only from the reference first-eye image and the output second-eye image is generated only from the reference second-eye image, other images may in some embodiments also be considered. For example, for a single eye, the output image could be generated by combining/using/blending multiple reference images.

The generation of the output first-eye image and the output second-eye image may thus be separate processes. The output first-eye image is generated from the reference first-eye image based on the corresponding first-eye poses and depth values whereas the output second-eye image is generated from the reference second-eye image based on the corresponding second-eye poses and depth values. Thus, the reference first-eye image is shifted to provide the output first-eye image and the reference second image is shifted to provide the output second-eye image.

The view shift may in some cases be the same for both the first-eye image and the second-eye image, and thus the difference between the output first-eye pose and the reference first-eye pose may be the same as the difference between the output second-eye pose and the reference second-eye image (such as e.g. in the example of FIG. 2). However, in general, the pose differences may be different, e.g. a rotation of the head around a point close to the first eye will result in no or little position change for the first-eye image but a significant change in the position for the second-eye image. The individual generation of the output first-eye image and second-eye image may allow such differences to easily be reflected in the generated output images.

Any difference measure indicative of the difference between two poses may be used. For example, a difference measure determined as a distance (e.g. Euclidian and/or angular) between the two poses may be used. In most embodiments, the difference measure may be a scalar value indicative of a magnitude or absolute value of the difference (such as e.g. a simple distance measure).

The difference between the view pose and the reference pose for the first and/or second eye may be determined in accordance with any suitable distance or difference measure. The difference may for example be determined as a monotonically increasing function of the distance between a position of the view pose and a position of the reference pose and/or a monotonically increasing function of an (absolute value of an) angular difference between an orientation of the view pose and an orientation of the reference pose.

For example, in some embodiments, the difference between the view pose and the reference pose may be a difference between a view position and a reference position. In such a case, any spatial distance measure may be used. For example, a Euclidian distance may be determined, or a distance along a specific axis/direction may be used (e.g. only the distance in the x-direction or z-direction may be used).

In some embodiments, the difference between the view pose and the reference pose may be a difference between a view orientation and a reference orientation. In such a case, any angular difference or distance measure may e.g. be used. For example, each of the orientations may be represented by a direction in the form of a vector, and the difference measure may be determined as the (absolute value of the) angle between the two vectors in the plane comprising the two vectors (or as a monotonic function of these).

In some embodiments, the difference between the view pose and reference pose may reflect a difference between both a view orientation and a reference orientation and between a view position and a reference position. For example, the distance measures mentioned in the previous paragraphs may be intermediate difference measures that are combined to generate the final distance measure, e.g. by a weighted summation with the weights set appropriately between the angular and position distance difference measures. The weights may for example reflect the expected relative perceptual importance of each of the measures (and consider the units for the values to provide a suitable conversion). In some embodiments, more complex combination functions may of course be used. For example, the weights of the weighted combination may themselves be dependent on the angular difference and the position distance measure.

As another example, in some embodiments where the view poses and reference poses are given by vectors comprising a number of position and/or orientation coordinates, the difference may e.g. be determined as:

$$D = \sum_{i=0}^{n} \alpha_i f_i(p_{i,v} - p_{i,r})$$

where n is the number of coordinates in the vectors minus one, $p_{i,v}$ is coordinate i of the view pose vector, $p_{i,r}$ is coordinate i of the reference pose vector, $f_i(p_{i,v}-p_{i,r})$ is a monotonic function of the absolute value of $p_{i,v}-p_{i,r}$, and $\alpha_i$ is a weight factor for coordinate i. In such an embodiment, the difference measure can e.g. be reduced to a position distance measure by setting the weight factor to zero for all orientation coordinates, and the difference measure can e.g. be reduced to an orientation difference by setting the weight factor to zero for all position coordinates.

Thus, the image synthesizer 303 generates an output stereo image which corresponds to the current view pose. As long as the difference between the reference and the output/synthesis view poses is sufficiently small (within the sweet spot) this can be done with high image quality and typically without it being perceptible to the viewer that images are synthesized by view shifting. Accordingly, in a dynamic, real time application, the output stereo images may accordingly be dynamically updated to follow small head movements of the user. For example, correct stereopsis and motion parallax may be provided for a user nodding or shaking his head etc.

However, the apparatus of FIG. 3 further comprises means for adapting the operation based on the difference between the reference pose and the view pose. Specifically, rather than use the received depth values directly when synthesizing the images, the apparatus may adapt/modify the depth values depending on the difference between the reference and synthesis/output view poses.

Specifically, the apparatus comprises a first modifier 307 which is arranged to generate modified first depth values from the received first depth values, and a second modifier 309 which is arranged to generate modified second depth values from the received second depth values. The modified depth values are fed to the image synthesizer 303 where they are used for the synthesis of respectively the output first-eye image and the output second-eye image.

The modification is based on a reference depth value and accordingly the apparatus further comprises a depth processor 311 which is arranged to determine a reference depth value and feed it to the first and second modifiers 307, 309.

The first modifier 307 is arranged to generate the modified first depth values by reducing a difference between the received reference first depth values and the reference depth value by an amount that depends on a difference between the first-eye view pose and the first-eye reference pose. Similarly, the second modifier 309 is arranged to generate modified second depth values by reducing a difference between the received reference second depth values and the reference depth value by an amount that depends on a difference between the second-eye view pose and the second-eye reference pose. The amount of the reduction may in some scenarios be the same but will typically not be identical (and indeed the difference between the view poses and the reference poses will typically be different).

In the apparatus, the depth values that are used for synthesis may thus be modified such that the difference to a reference depth value is reduced by an amount which depends on the difference between the view pose and the reference pose for that eye. The amount of the reduction may typically be a monotonic function of the (absolute value) of the difference (e.g. distance). The depth values for a given image may thus be brought closer to a reference depth value the larger the difference between view pose and the reference pose for the eye.

However, the reduction is applied individually to the depth values for the first-eye image and the second-eye image. Thus, the reduction in depth with respect to the reference depth value for one of the images may reduce the amount of view shift that is applied to the individual image. However, the disparities between the different eye images is not removed and therefore the 3D perception of depth remains.

As a low complexity example, the reference depth value may be set to a predetermined depth value. For example, for a conference application it may be assumed that the typical distance from a stereo camera to the person being captured is, say, 1.2 m. Accordingly, the reference depth value may be set to the depth value corresponding to this distance, i.e. corresponding to 1.2 m.

The first modifier 307 and the second modifier 309 may typically apply the same function to determine the amount of reduction to apply such that the same difference between view pose and reference pose results in the same reduction (whether in absolute or relative terms). As a low complexity example, it may be considered that for poses within the sweet sport, no reduction is applied and for poses outside the sweet spot, all depth values are set equal to the reference depth value. Thus, if the first-eye view pose is within the sweet spot of the reference first-eye pose (say the distance is less than 2 cm), then no change is applied to the first depth values. However, if it is outside the sweet spot, then all depth values are set constant to the reference depth value, e.g. to a depth value corresponding to a distance of 1.2 m.

Accordingly, when performing view shift to the reference first-eye image, a first-eye view pose within the sweet spot will result in a full view pose shift resulting in an image being generated corresponding to the new pose. However, if the first-eye view pose is outside the sweet spot, then the view shift may be based on the same depth value for all pixels and image objects. This will simply result in the output image being generated to correspond to the reference input image but with all pixels shifted in the same direction and by the same amount.

The same approach is independently performed for the second-eye image.

Thus, for increasing distance to the reference pose, the depth variation is reduced for each of the first-eye image and second-eye images individually. This results in less differentiation in the shifting of objects in the image thereby reducing the image quality degradation and artefact introduction (e.g. there is less de-occlusion).

However, the depth reduction does not result in an output stereo image being generated which lacks depth, i.e. it does not result in a 2D stereo image being generated. Rather, the generated output image for the first and second eye images may each have less depth variation within them in terms of individual variations within the image, but the depth difference represented by the disparities between the received reference first-eye image and second-eye image is maintained.

Indeed, it has been found in practice that whereas the approach may introduce some distortion when the distance between view poses and references poses increase too much, the overall effect is perceived as highly advantageous. Indeed, the effect is described as a natural perception and gradual degradation. It has been found that a satisfactory 3D user experience can be perceived for larger pose variations. In particular, it has been found that the approach may provided improved perceived consistency between motion parallax and stereopsis cues for poses outside the sweet spot.

It should be noted that the image synthesizer 303 shifts the reference first-eye image and the reference second-eye image in the same direction for the same direction of the difference between the reference pose and view pose. Thus, often a head movement results in the first-eye view pose and second-eye view pose moving in the same direction, and the resulting shifts applied by the image synthesizer 303 may accordingly be in the same direction. Thus, the effective view pose changes accordingly. This is in contrast e.g. to situations where the disparity offset between first and second eye images are adapted to change the depth that corresponds to the display/image plane (i.e. moving things forward or back relative to the screen). In such cases, disparity is changed by moving corresponding pixels/image objects in opposite directions.

In many embodiments, the amount of reduction with respect to a reference depth level changes gradually with respect to the difference between the view pose and the reference pose for at least some values of the difference. Thus, for at least some values of the difference, the amount of reduction may be a one to one function of the difference and vice versa, i.e. it may have one to one correspondence and be a bijective function. Thus, for a range of values for the difference, there may be a one to one mapping to a corresponding range of the amount of reduction. The one to one mapping may specifically be a monotonically increasing one to one mapping to a range of the amount. Thus, an increasing difference results in an increasing amount of reduction (and thus a decreasing difference between the modified value and the reference depth value). The one to one mapping may specifically be to a range of the amount from no reduction (i.e. no change in the depth value) to a 100% reduction (setting the modified depth value equal to the reference depth value).

In many embodiments, the reduction in the difference between the received depth value and the reference depth value may be achieved by scaling the difference between the depth value and the reference depth value by a positive value less than one. Thus, the first modifier 307 may be arranged to generate modified depth values by scaling a difference between the first depth values and the reference depth value by a scale factor having a value between zero and one for at least some values of the difference between the first-eye view pose and the first-eye reference pose. Similarly, the second modifier 309 may be arranged to generate modified depth values by scaling a difference between the second depth values and the reference depth value by a scale factor having a value between zero and one for at least some values of the difference between the view second-eye pose and the second-eye reference pose.

The scaling may typically be the same for both the first modifier 307 and the second modifier 309, i.e. they may be identical and apply the same scaling for the same difference.

Figure 4:
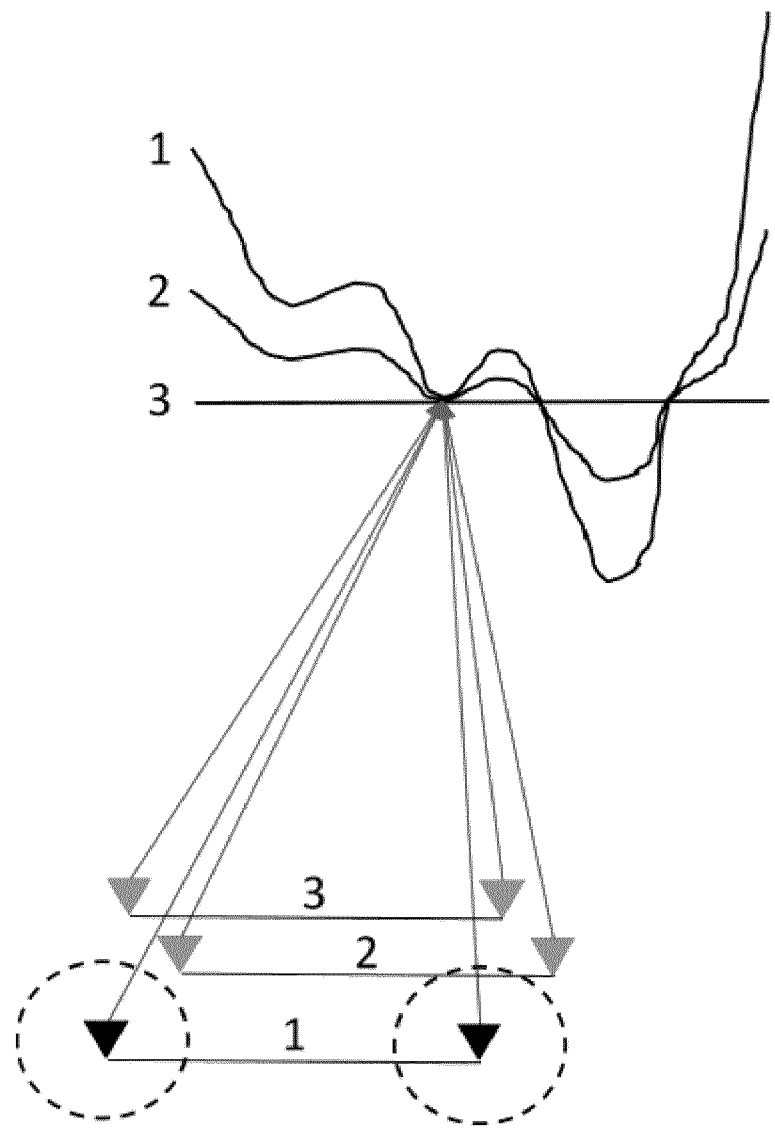
FIG. 4 illustrates an example of depth variations and view poses.

An example of the approach is shown in FIG. 4. In the example, a reference depth value is indicated by the depth line 3 whereas the input depth is indicated by depth line 1. As illustrated by the example, when the view poses are such that they coincide with the reference poses (situation 1) then the output depth values may be generated to be identical to the input depth values, i.e. a scale factor of 1 is applied. When the view poses are very far from the reference poses (situation 3), the modified depth values may all be set to be identical to the reference depth value, i.e. a scale factor of zero is applied to the difference between the received depth value and the reference depth value. For a view pose in between (situation 2 in the example, just outside the sweet sport), a scaling value between 0 and 1 may be applied thereby biasing the depth values towards the reference depth value.

In many embodiments, the difference between the reference depth value and the reduced depth values may be reduced to substantially zero, i.e. the modified depth values may be set substantially identical to the reference depth value, for at least some values of the difference. Specifically, if the (magnitude/absolute value) of the difference between the view pose and reference pose exceeds a threshold, the modified depth values may be set identical to the reference depth value. This may for example be achieved by setting the scale factor to zero for these values. As a result, the modified depth values will all be constant, and the view shift performed by the image synthesizer 303 will result in all pixels being shifted by the same amount.

In many embodiments, the first modifier 307 and the second modifier 309 may be arranged to not modify the depth values for at least some values of the difference between the corresponding view pose and reference pose. Specifically, the first modifier 307 may be arranged to not reduce the difference between the first depth values and the reference depth value for at least some values of the difference between the first-eye view pose and the first-eye reference pose. Similarly, the second modifier 309 may be arranged to not reduce the difference between the second depth values and the reference depth value for at least some values of the difference between the second-eye view pose and the second-eye reference pose. Specifically, the modifiers 307, 309 may generate the modified depth values to be identical to the received depth values if (the magnitude/absolute value of) the difference is less than a threshold. The threshold may be selected to correspond to the region for which it is considered that the resulting image quality from view shifting is sufficient (e.g. with no degradation being perceptible), i.e. it may be selected to correspond to the sweet spot.

This may specifically be achieved by setting the scale factor equal to one for the difference between the view pose and reference pose meeting a criterion, such as the difference being below a threshold corresponding to the sweet spot.

In the following a specific example will be provided in which such an approach is used to modify depth values. In the example, $d_{eye}$ is used to denote the difference between the view pose and the reference pose which in the specific example is determined as the Euclidean distance between the current eye (first or second) 3D position and the reference camera view position for the camera that is used for synthesis of a new view for this eye. We now introduce a radius parameter $R_1$ for the spherical sweet spot. A typical value for $R_1$=0.01 m when rendering captured scenes with objects as close-by as 0.25 m. We also introduce a second radius parameter $R_2$ with a typical value of $R_2$=0.1 which is the distance beyond which we will have scaled the depth map back to a plane (no remaining depth variation).

Let $z_{ref}$ denote the assumed reference plane towards which we wish scale the depth map, i.e. it represents the reference depth value. Please note that the reference depth may be a constantly changing value that correspond with the observed depth in the gaze direction of the viewer. For each pixel (i,j) in the depth map (i.e. for each depth value in the depth map), we now calculate the difference with the reference depth:

$$\Delta(i,j)=z(i,j)-z_{ref}$$

We also calculate the scale factor that we apply depending on the distance of the eye to the center of the sweet spot:

$$s = \begin{cases} 1 & \text{if } d_{eye} < R_1 \\ 1 - \min\left(\frac{d_{eye}}{R_2}, 1\right) & \text{if } d_{eye} \geq R_1 \end{cases}.$$

Figure 5:
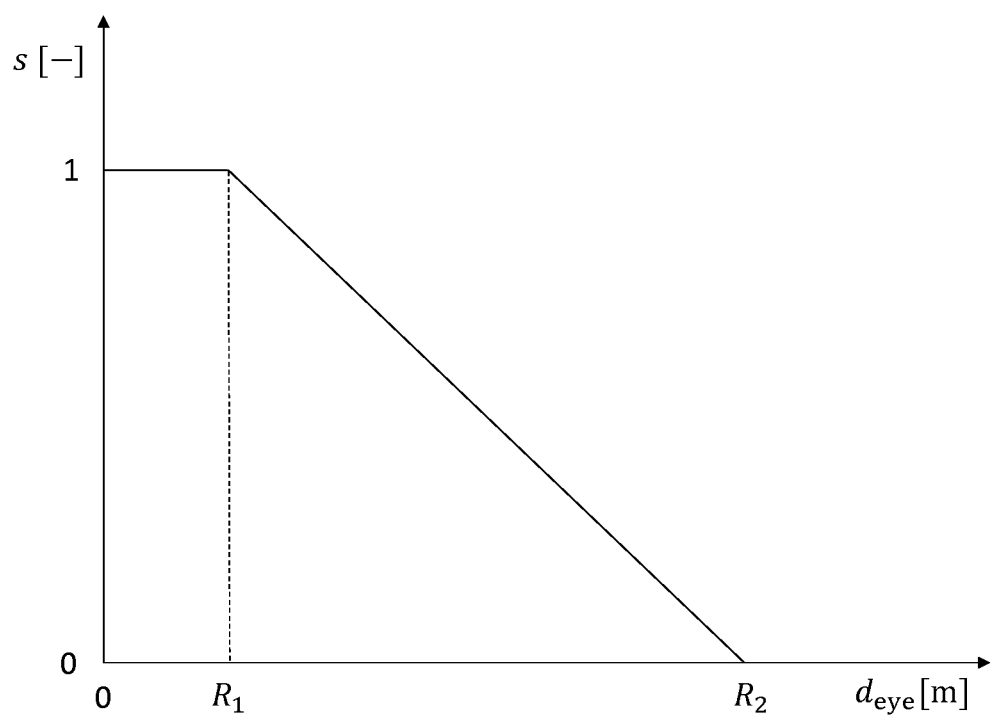
FIG. 5 illustrates an example of a relationship between a difference between a view pose and a reference pose, and a scale factor.

The scale factor s reduces to 0 when $d_{eye}$=$R_2$. FIG. 5 shows the scale factor as a function of the difference $d_{eye}$.

The depth is now modified as:

$$z_{out}(i,j)=z_{ref}+s\Delta(i,j).$$

In the example, the same relationship between the amount of reduction (the scale factor) and the differences in pose is used for both the first-eye image and the second-eye image, i.e. the above description may be considered to apply individually to both the first modifier 307 and the second modifier 309.

It will be appreciated that whereas the specific example uses a scale factor to reduce the difference between depth values and the reference depth value, other approaches may be used in other embodiments. For example, a variable depth offset may be subtracted from the received depth values with this offset being dependent on the difference between the view pose and reference pose.

In the previous example, the reference depth value was determined as a predetermined, fixed value that is selected depending on the specific setup. For instance 0.75 m for a typical conferencing distance of 0.75 m or 1.5 m for a typical conferencing distance of 1.5 m. However, in many embodiments, the reference depth value may be a dynamically determined value.

For example, in many embodiments, the depth processor 311 may be arranged to determine the reference depth value in response to the first and/or second depth values for the reference images. For example, the reference depth value may be determined as the average depth value or the depth value of an image object. For example, face detection may be used to detect an image object corresponding to a face and the reference depth value may be set to the average depth value for the identified image object.

In many embodiments, the depth processor 311 may be arranged to determine the reference depth value based on a gaze of the viewer.

The depth processor 311 may specifically comprise a gaze estimator which is arranged to estimate a gaze point in the first-eye image and/or in the second-eye image. The gaze point is indicative of the viewers gaze within the image, and thus reflects where in the image the user is looking.

The gaze point may for example be determined by capturing camera images of the observer and extracting the eye image regions after face detection. The pupil can then be detected since this is a relatively dark region. The position of the pupil relative to the eye region can be used to calculate the gaze direction in 3D space. This can be done using cameras that are integrated in a display or using cameras that are integrated into a virtual reality headset. An even simpler approach is to assume that the gaze direction corresponds with the viewer direction (head orientation). The gaze point can then be assumed to correspond with the center point for each first/second eye image.

The reference depth value may then be set to a depth value for the gaze point. For example, if the gaze point is considered to define a specific pixel, the reference depth value may be set to the depth value of that pixel. If the gaze point is considered to have a spatial extension, the reference depth value may e.g. be set to the average of the depth values within an area corresponding to the gaze point. The reference depth value may in some embodiments be determined based on the first-eye image and in other embodiments based on the second-eye image, or may indeed be based on both. For example, a gaze point may be determined in both the first-eye image and the second-eye image and the reference depth value may be set as the average of the corresponding depth values in the two images. This may in many embodiments provide a substantially improved user experience and may substantially reduce the perceptibility of any distortion resulting from the modifications of depth values for larger distances to the reference pose.

The approach specifically reflects the realization that the perceived effect of spatial distortions heavily depend on where in the scene the viewer is looking. For instance, when the viewer happens to be looking at a distant object, he does not observe parallax changes due to view pose shifting. The most important parts of an image are concentrated in a small solid angle around the gaze direction/point. Therefore, reducing parallax distortions and changes in the gaze direction may substantially improve the perceived image quality.

Figure 6:
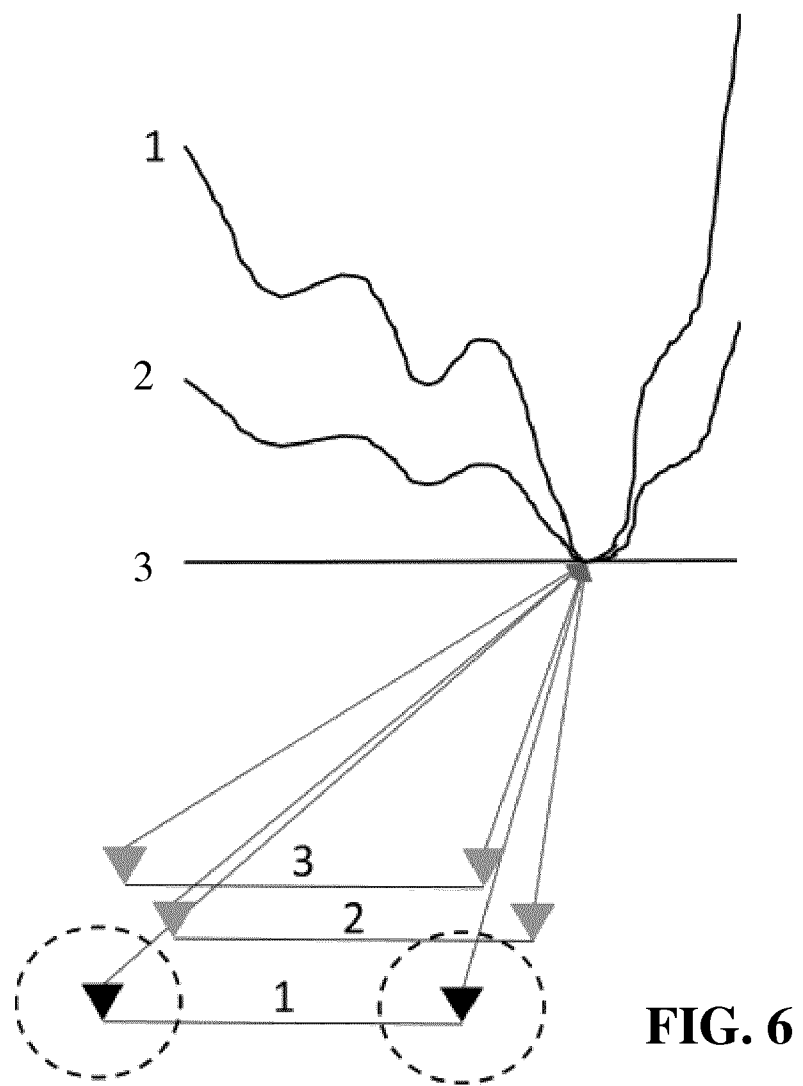
FIG. 6 illustrates an example of depth variations and view poses.

FIG. 6 illustrates the situation corresponding to FIG. 5 but with the viewer changing his gaze point to the most forward part of the scene. As a result, the reference depth value changes to the most forward depth, and the scaling that dependents on the pose difference is now relative to this depth, i.e. relative to the most forward part of the scene. The example may thus reflect the application of a scale factor around the depth that corresponds to a person's gaze direction (typically the object of attention). As a result, the perceived parallax change reduces in the gaze direction when a person moves outside the sweet spot.

It should be noted that a particularly advantageous effect is that the perceived 3D experience and depth of the scene is not removed even for larger differences between the view pose and the reference pose. Thus, whereas the depth variation for the individual image is reduced thereby reducing artefacts and degradation by the individual view shift operation (e.g. due to de-occlusion), the disparity between the output first-eye image and second-eye image is maintained thereby keeping a stereoscopic 3D effect when presented to the two eyes of a viewer.

Simplistically, it can be exemplified by a consideration that whereas the effect on each individual image is to reduce the depth towards a "flat" image, the two images together still provide a stereo image with disparity between the left and right image (between the first and second images, or vice versa) and thus provide a perception of depth in the scene. The output first-eye image and output second-eye image accordingly include stereopsis clues.

This may be illustrated by considering a specific example.

Figure 7:
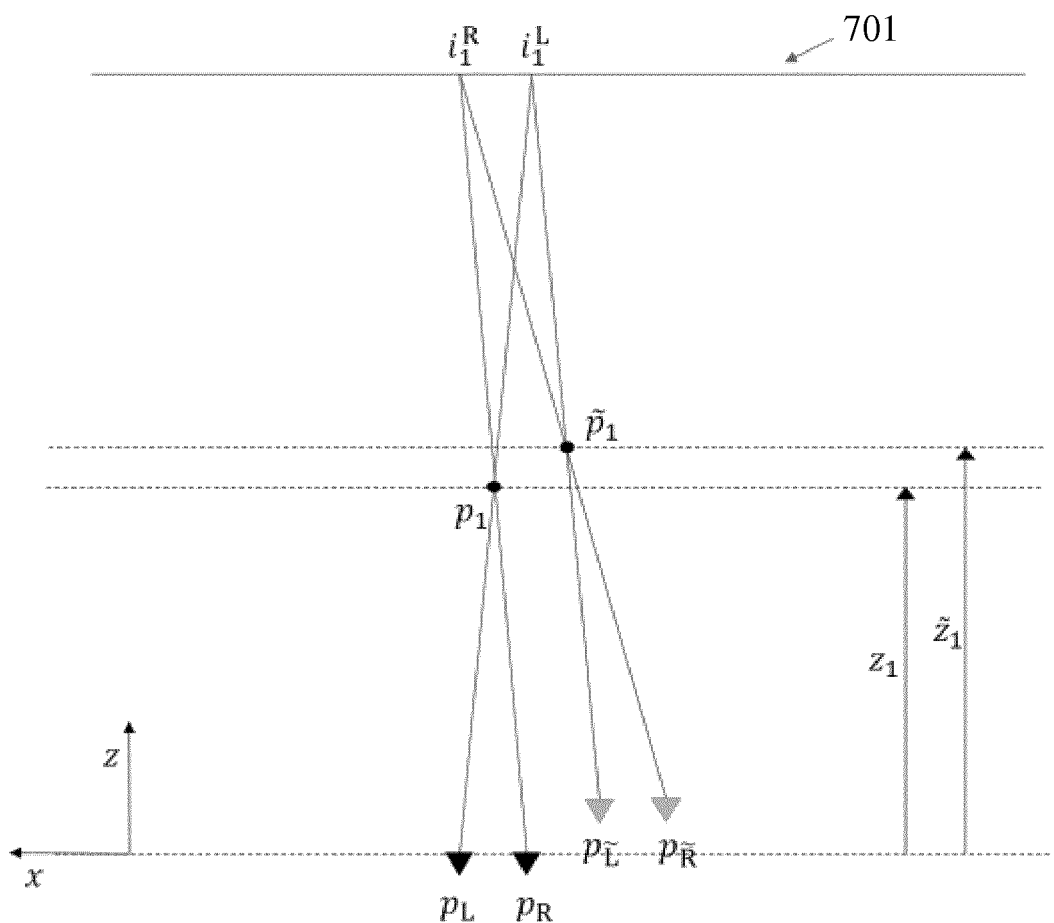
FIG. 7 illustrates an example of a relationship between image positions and position and depth perception for image objects.

FIG. 7 shows a scenario in which a traditional stereoscopic display may present a stereo image on a suitable display panel 701 at a given distance from a viewer. In this case, two image points $i_1^L$ and $i_1^R$, corresponding to one point on an object, are presented to respectively the left and right eyes of a viewer. A user with eyes at positions ($p_L$, $p_R$) will perceive the point/object to be at a depth position $p_i$. In this example, there is no depth data provided with the stereo images and accordingly no view shifting is performed, and the image points do not change position. As a result, if the viewer moves his eyes from positions ($p_L$, $p_R$) to positions ($p_{\tilde{L}}$, $p_{\tilde{R}}$), the virtual 3D object point also moves from position $p_i$ to position $\tilde{p}_1$. Accordingly, a change in position including a change of the depth of the object occurs when the user changes viewpoint. However, for a correct motion parallax, the object point should remain stationary when the viewer moves his head. The stereoscopic and motion parallax cues are not consistent in such a traditional approach.

Figure 8:
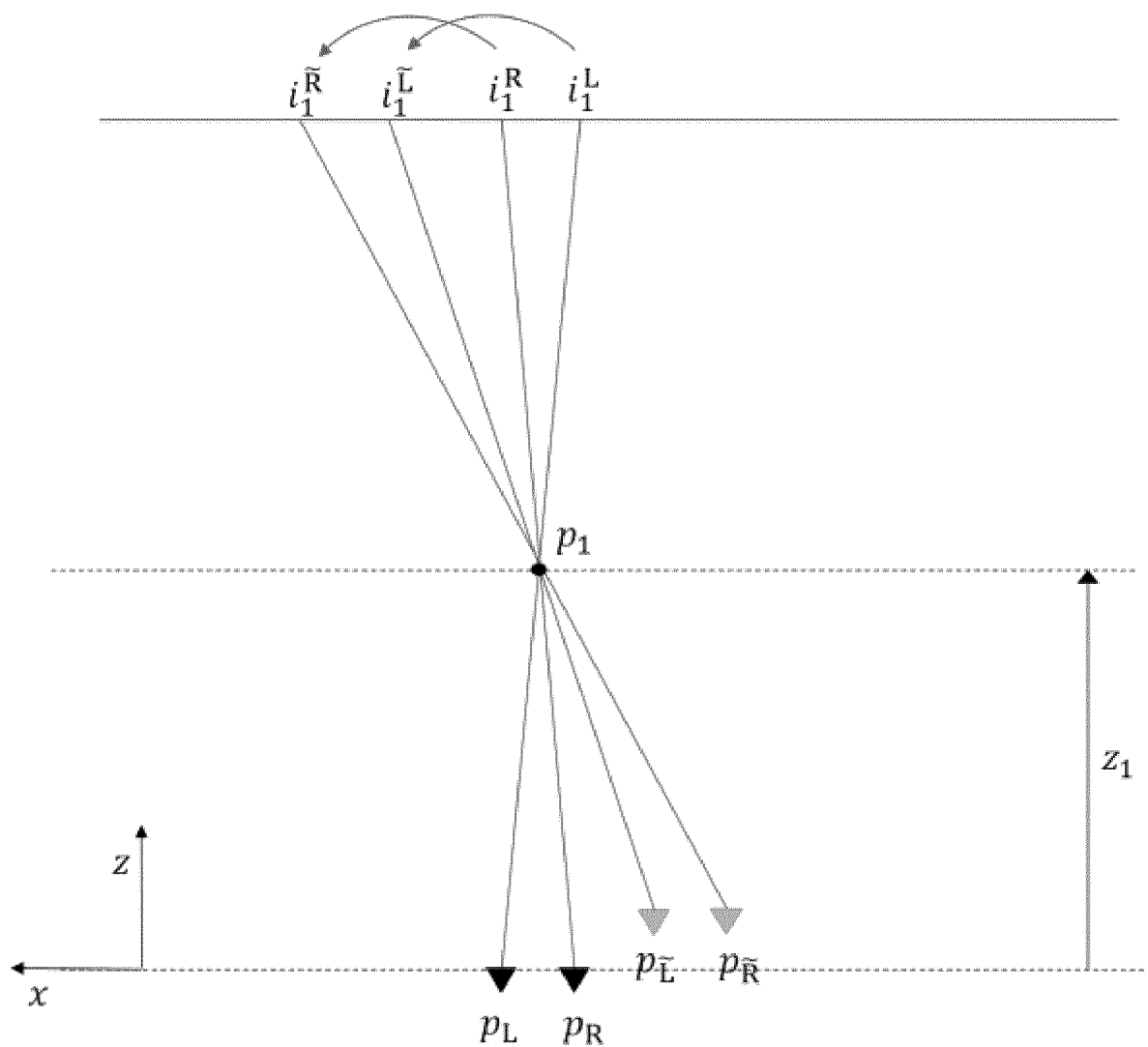
FIG. 8 illustrates an example of a relationship between image positions and position and depth perception for image objects.

FIG. 8 illustrates a corresponding example but where depth data is available and suitable view shifting is performed based on the changes in viewer pose. In this example, when the viewer moves his head, the image points are moved accordingly on the display panel (curved arrows). As a result, the object point $p_1$ remains stationary when the viewer moves his head and the stereoscopic and motion parallax cues are consistent. However, for larger shifts, the view shift may introduce errors, degradations, or artefacts.

Figure 9:
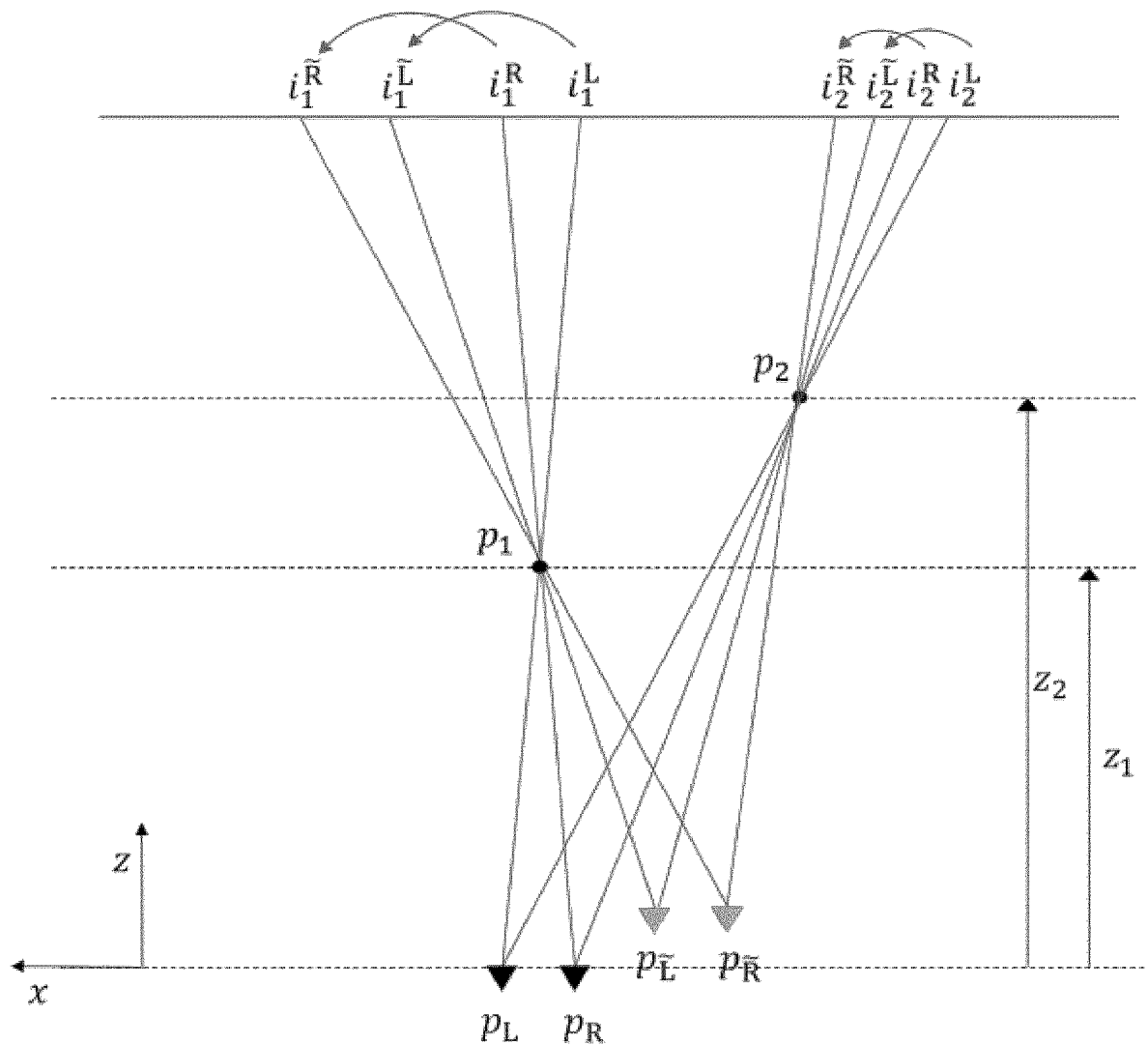
FIG. 9 illustrates an example of a relationship between image positions and position and depth perception for image objects.

FIG. 9 illustrates the example of FIG. 8 but further considering a second object point $p_2$ which is at a different depth $z_2$. When the viewer moves the head, depth data is again used to perform view shifting. However, the size of the required shift depends on the depth of the point and since the second point lies at a larger depth, its motion parallax (curved arrows) for each eye will be smaller than for the first point. The stereoscopic and motion parallax cues remain consistent for both object points but degradation due to view shifting occurs for larger view shifts.

Figure 10:
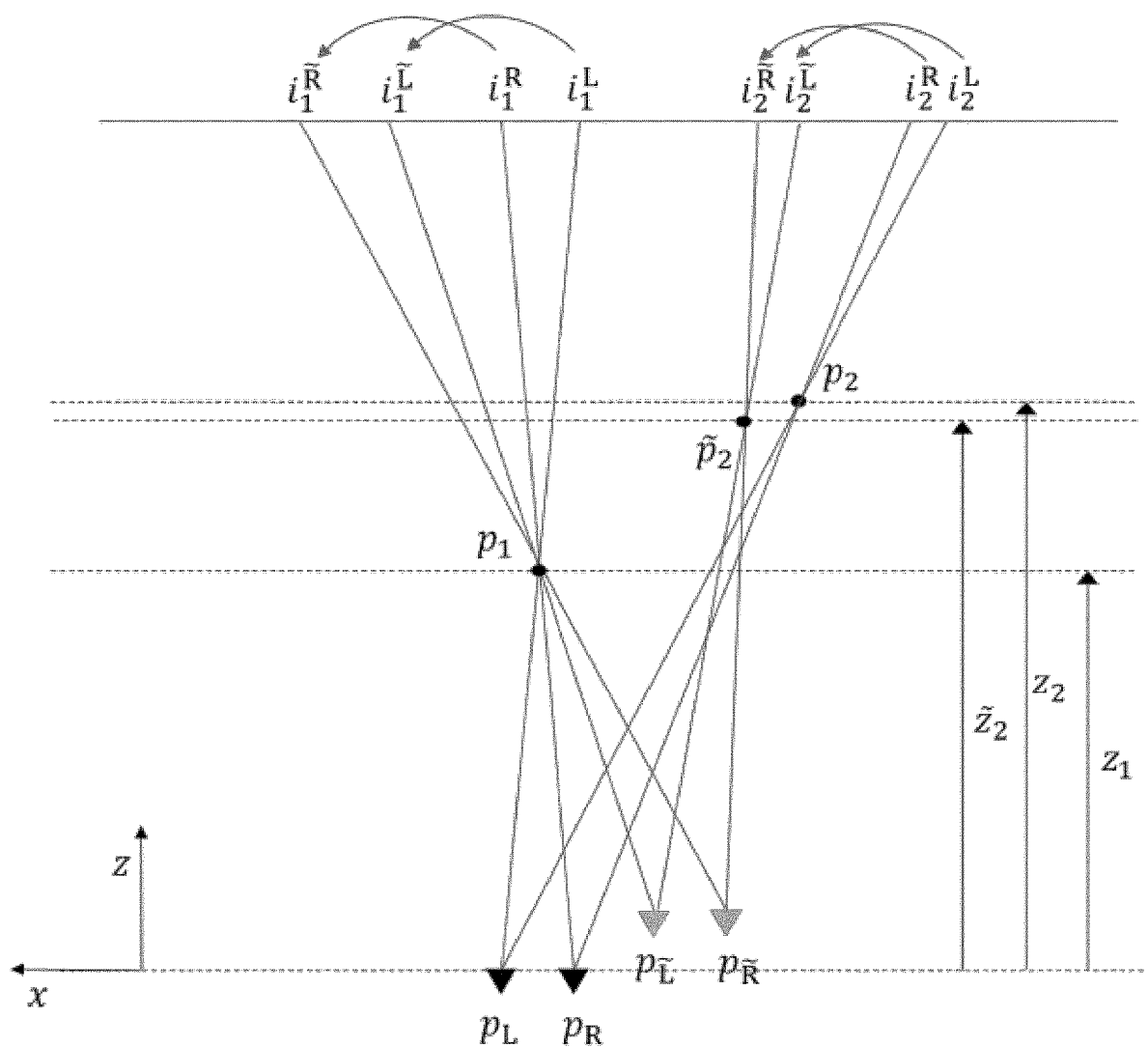
FIG. 10 illustrates an example of a relationship between image positions and position and depth perception for image objects.

FIG. 10 illustrates the approach of the described apparatus where the depth variations have been reduced for each individual image. As a consequence of the reduced depth variation around the reference depth value, the difference in the variation in the applied view shift for points at different depths in the scene is reduced and specifically if the depth is set to be the same for all values (i.e. the modified depth values are set equal to the reference depth value) then the shifts will be identical. A substantial advance of this is that it may reduce degradation in image quality resulting from the view shift. In particular, it may reduce or indeed remove de-occlusion as all pixels are moved in the same direction and possibly by the same amount.

However, as illustrated in FIG. 10, the second object point $p_2$ will be shifted by a wrong amount for the depth $z_2$. This will result in the shifted object point being perceived to be at a different position $\tilde{p}_2$. including at a different depth $\tilde{z}_2$. The stereoscopic and motion parallax cues are accordingly consistent for the first point but not for the second point.

However, the perceived scene is still a three dimensional scene and indeed the perceived position shift may often be relatively small. Further, in the described approach the trade-off between the image quality degradation and the position consistency can flexibly be adapted dependent on the difference between the view pose and the reference pose.

In addition, if the reference depth value is adapted based on the gaze point, the perceptible impact of distortions to objects at other depths may be reduced substantially and indeed typically if the viewer has a gaze in the direction of the first point in the example, he may not even notice the inconsistency regarding the second point.

In many embodiments, the first modifier 307 may be arranged to apply a limit to the difference between the generated first modified depth values and the reference depth value. Similarly, the second modifier 309 may be arranged to apply a limit to the difference between the generated second modified depth values and the reference depth value. Thus, the depth values may be constrained with respect to the reference depth value by the application of a maximum and/or minimum depth value. In some embodiments, a limit may be applied only in one direction (e.g. a maximum forward or backwards value may be defined) but in other embodiments limits may be applied both for increasing and decreasing depth values.

Figure 11:
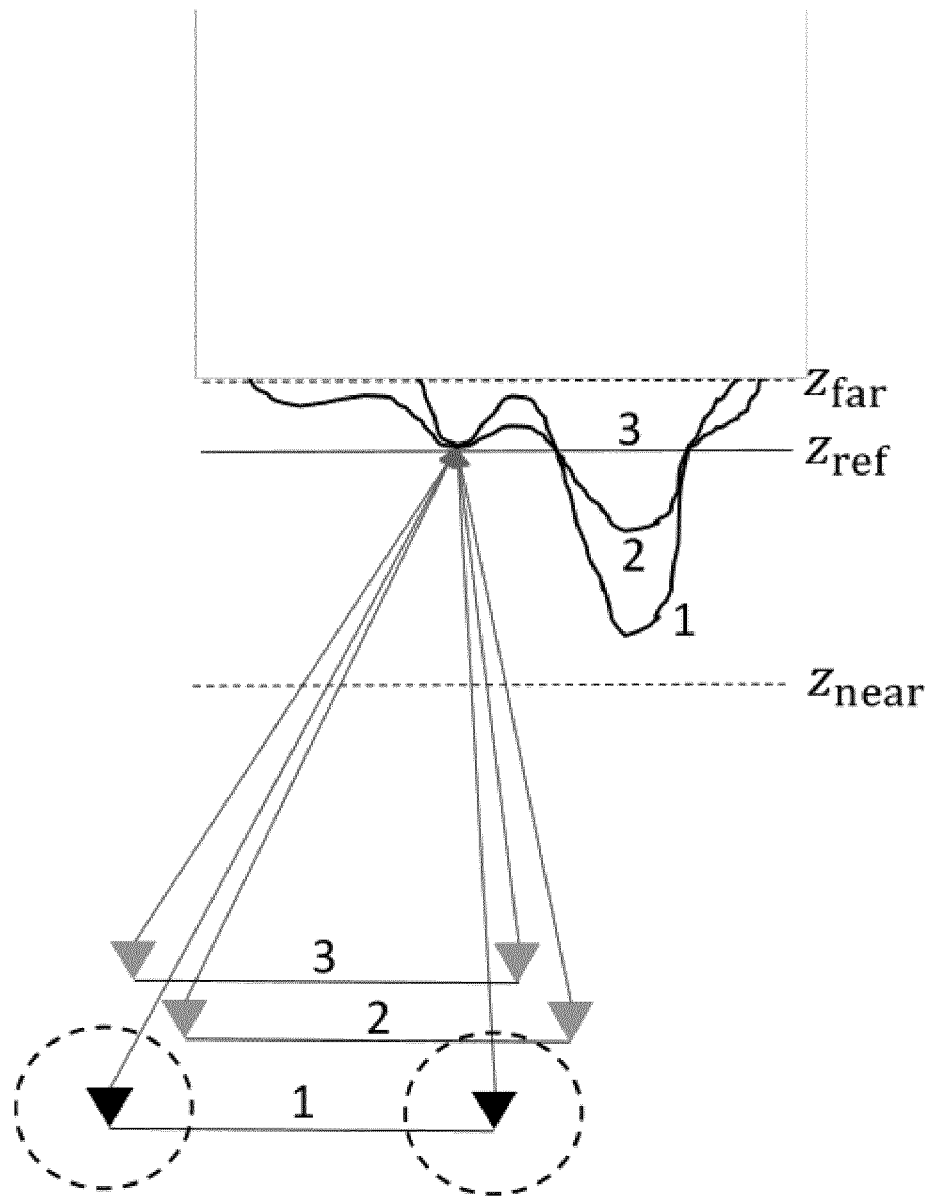
FIG. 11 illustrates an example of depth variations and view poses.

An example of a scenario with depth limits is illustrated in FIG. 11. In the example, clipping of the depth values to values between $z_{far}$ and $z_{near}$ is applied in order to further reduce view shift artefacts.

In the specific example, objects close to the viewer are displayed with their true depth induced motion parallax since the near clipping plane lies closer to the viewer than the closest object. However, the depth of objects that lie just a little distance behind the reference plane will be clipped at the far clipping plane $z_{far}$. As a result, not much depth variation will be allowed behind the reference plane which will reduce rendering errors and de-occlusion artefacts.

As the reference depth can change continuously depending on the dynamic viewing-direction or gaze direction of the observer, so can the near and far clipping planes. For instance, we can force the depth variation in the resulting view to always have a maximum distortion (warp distance) of 10 pixels and select the near and far depth clipping range such that this maximum warp distance is kept. In practice this could mean that the near and far clipping ranges lie close to the reference depth when this reference depth lies close to the observer (nearby objects give larger parallax) and conversely they lie further away from the reference depth when this depth is larger. In this way, image rendering quality can be controlled independent of the reference depth. In some embodiments, the clipping planes can also be introduced in a gradual manner (as the scaling), e.g. the further the deviation from the sweet spot, the closer each clipping plane moves to its final fixed value.

The terms first and second may be replaced by left and right, respectively or vice versa. E.g. the terms first-eye view pose, second-eye view pose, reference first-eye image, and reference second-eye image may be replaced by left-eye view pose, right-eye view pose, reference left-eye image, and reference right-eye image, respectively (or vice versa).

It will be appreciated that the described approaches and principles can be applied in many different and varied applications and scenarios, and that the previous description for clarity has focused on a less complex example.

For example, the approach could be used for playback of the widely used 360 omnidirectional stereo (ODS) format. Indeed, it would be possible to use the described principles even without transmission of dense depth maps. For example, an ODS player could include graphics card shader code that could perform a single disparity measurement on a small image patch (e.g. a region of 32×32 pixels) in the center of the stereo eye-pair that is already being extracted from the ODS format during rendering (i.e. essentially at the very end of the rendering pipeline). This single depth value can then be applied to all pixels using another shader (global shift on both images). When looking around in 360, the motion parallax effect will be adopted to the overall depth in a certain direction (e.g. a person standing close versus everything being far away in another direction).

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed, the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus, references to "a", "an", "first", "second" etc. do not preclude a plurality. Reference signs in the claims are provided merely as a clarifying example and shall not be construed as limiting the scope of the claims in any way.

The invention claimed is:

1. An image generating apparatus comprising:
   a determiner circuit, wherein the determiner circuit is arranged to determine a first-eye view pose and a second-eye view pose;
   a receiver circuit,
      wherein the receiver circuit is arranged to receive a reference first-eye image with associated first depth values and a reference second-eye image with associated second depth values,
      wherein the reference first-eye image is for a first-eye reference pose and the reference second-eye image is for a second-eye reference pose;
   a depth processor circuit, wherein the depth processor circuit is arranged to determine a reference depth value;
   a first modifier circuit,
      wherein the first modifier circuit is arranged to generate modified first depth values by reducing a difference between the first depth values and the reference depth value by a first amount,
      wherein the modified first depth values are dependent on a difference between the first-eye view pose and the first-eye reference pose;
   a second modifier circuit,
      wherein the second modifier circuit is arranged to generate modified second depth values by reducing a difference between the second depth values and the reference depth value by a second amount,
      wherein the modified second depth values are dependent on a difference between the second-eye view pose and the second-eye reference pose; and
   a synthesizer circuit,
      wherein the synthesizer circuit is arranged to synthesize an output first-eye image for the first-eye view pose by view shifting the reference first-eye image based on the modified first depth values,
      wherein the synthesizer circuit is arranged to synthesize an output second-eye image for the second-eye view pose by view shifting the reference second-eye image based on the modified second depth values.

2. The image apparatus of claim 1, wherein the depth processor circuit is arranged to determine the reference depth value as a predetermined reference depth value.

3. The image apparatus of claim 1,
   wherein the depth processor circuit is arranged to determine a gaze point for a viewer in at least one of the reference first-eye image and the reference second-eye image,
   wherein the depth processor circuit is arranged to determine the reference depth value in response to a depth value of at least one of the first depth values and the second depth values for the gaze point.

4. The image apparatus of claim 1, wherein the first modifier circuit is arranged to reduce a difference between the first depth values and the reference depth value to substantially zero for at least some values of a difference between the first-eye view pose and the first-eye reference pose.

5. The image apparatus of claim 1, wherein the first modifier circuit is arranged to not reduce a difference between the first depth values and the reference depth value for at least some values of the difference between the first-eye view pose and the first-eye reference pose.

6. The image apparatus of claim 1, wherein the first modifier circuit is arranged to determine the first amount as a monotonically increasing function of a difference between the first-eye view pose and the first-eye reference pose.

7. The image apparatus of claim 1,
   wherein the first modifier circuit is arranged to generate modified depth values by scaling a difference between the first depth values and the reference depth value by a scale factor,
   wherein the scale factor has a value between zero and one for at least some values of a difference between the first-eye view pose and the first-eye reference pose.

8. The image apparatus of claim 7, wherein the scale factor is a monotonically decreasing function of a difference between the first-eye view pose and the first-eye reference pose for at least a range of the difference between the first-eye view pose and the first-eye reference pose.

9. The image apparatus of claim 7, wherein the scale factor has a value between 0.95 and 1.05.

10. The image apparatus of claim 1, wherein the synthesizer circuit is arranged to shift the reference first-eye image and the reference second-eye image in the same direction.

11. The image apparatus of claim 1, wherein the first modifier circuit is arranged to limit the difference between the first modified depth values and the reference depth value.

12. The image apparatus of claim 1, wherein the first modifier circuit is arranged to apply a same relationship between the first amount and the difference between the first-eye view pose and the first-eye reference pose as the relationship applied by the second modifier circuit between the second amount and the difference between the second-eye view pose and the second-eye reference pose.

13. The method of claim 12, wherein the reference depth value is a predetermined reference depth value.

14. The method of claim 12, further comprising:
determining a gaze point for a viewer in at least one of the reference first-eye image and the reference second-eye image; and
determining the reference depth value in response to a depth value of at least one of the first depth values and the second depth values for the gaze point.

15. The method of claim 12, further comprising reducing a difference between the first depth values and the reference depth value to substantially zero for at least some values of a difference between the first-eye view pose and the first-eye reference pose.

16. The method of claim 12, further comprising not reducing a difference between the first depth values and the reference depth value for at least some values of the difference between the first-eye view pose and the first-eye reference pose.

17. The method of claim 12, further comprising generating modified depth values by scaling a difference between the first depth values and the reference depth value by a scale factor, wherein the scale factor has a value between zero and one for at least some values of a difference between the first-eye view pose and the first-eye reference pose.

18. The method of claim 12, further comprising determining the first amount as a monotonically increasing function of a difference between the first-eye view pose and the first-eye reference pose.

19. A computer program stored on a non-transitory medium, wherein the computer program when executed on a processor performs the method as claimed in claim 18.

20. A method of image generation, the method comprising:
determining a first-eye view pose and a second-eye view pose;
receiving a reference first-eye image with associated first depth values and a reference second-eye image with associated second depth values,
wherein the reference first-eye image is for a first-eye reference pose,
wherein the reference second-eye image is for a second-eye reference pose;
determining a reference depth value;
generating modified first depth values by reducing a difference between the first depth values and the reference depth value by a first amount, wherein the modified first depth values is dependent on a difference between the first-eye view pose and the first-eye reference pose;
generating modified second depth values by reducing a difference between the second depth values and the reference depth value by a second amount, wherein the modified second depth values is dependent on a difference between the second-eye view pose and the second-eye reference pose; and
synthesizing an output first-eye image for the first-eye view pose by view shifting the reference first-eye image based on the modified first depth values and an output second-eye image for the second-eye view pose by view shifting the reference second-eye image based on the modified second depth values.

* * * * *